(12) United States Patent
Lee et al.

(10) Patent No.: US 11,456,664 B2
(45) Date of Patent: Sep. 27, 2022

(54) BUCK-BOOST DC-DC CONVERTER

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Reza Eftekhari Rad, Suwon-si (KR); Qurat ul Ain, Suwon-si (KR); Jong Wan Jo, Suwon-si (KR); Kyung Duk Choi, Suwon-si (KR); Young Gun Pu, Suwon-si (KR)

(73) Assignees: SKAIChipsCo., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 17/097,230

(22) Filed: Nov. 13, 2020

(65) Prior Publication Data
US 2021/0143733 A1 May 13, 2021

(30) Foreign Application Priority Data
Nov. 13, 2019 (KR) .................. 10-2019-0145064

(51) Int. Cl.
*H02M 3/07* (2006.01)
(52) U.S. Cl.
CPC .................................... *H02M 3/07* (2013.01)
(58) Field of Classification Search
CPC ...... H02M 3/07; H02M 3/1582; H02M 1/007; H02M 7/04
See application file for complete search history.

(56) References Cited

U.S. PATENT DOCUMENTS

| | | | | |
|---|---|---|---|---|
| 9,634,559 | B2* | 4/2017 | Kim | H02M 3/07 |
| 2007/0205824 | A1* | 9/2007 | Perisetty | H03K 19/0013 |
| | | | | 327/536 |
| 2014/0253190 | A1* | 9/2014 | Chen | G06F 1/24 |
| | | | | 327/143 |
| 2016/0118991 | A1* | 4/2016 | Huang | H03K 5/082 |
| | | | | 331/18 |
| 2019/0103766 | A1* | 4/2019 | Von Novak, III | H02M 3/137 |
| 2019/0103824 | A1 | 4/2019 | Kim et al. | |
| 2019/0238053 | A1* | 8/2019 | Oliva | H02M 7/12 |
| 2019/0311749 | A1* | 10/2019 | Song | G11C 16/045 |

FOREIGN PATENT DOCUMENTS

| | | |
|---|---|---|
| JP | 2007-336722 A | 12/2007 |
| KR | 10-2014-0129918 A | 11/2014 |

OTHER PUBLICATIONS

A notice of allowance dated Jan. 21, 2020 for Korean Application No. 10-2019-0145064.

* cited by examiner

*Primary Examiner* — Sibin Chen
(74) *Attorney, Agent, or Firm* — Insight Law Group, PLLC; Seung Lee

(57) ABSTRACT

The present invention provides a technique for a power supply, and particularly, a buck-boost DC-DC converter which is advantageous for energy harvesting from a low voltage. An LC resonant unit generates a pair of clock type signals having phases opposite to each other from an input signal. These signals are supplied to the clock input terminals of the Dickson charge pumps connected in series and converted into power signals having an amplified voltage so as to match the rated input specification of the buck-boost DC-DC converter of a post-stage.

18 Claims, 11 Drawing Sheets

BUCK-BOOST DC-DC CONVERTER

RELATED APPLICATIONS

This application claims priority to Korean Patent Application No. 10-2019-0145064, filed on Nov. 13, 2019 in the Korean Intellectual Property Office, the entire disclosure of which is incorporated herein by reference.

BACKGROUND OF THE INVENTION

1. Field of the Invention

The present invention relates to a technique for a power supply, and particularly, to a buck-boost DC-DC converter.

2. Description of the Related Art

A buck-boost DC-DC converter is known as a power conversion technique which achieves high efficiency. However, the buck-boost DC-DC converter also has a limit in a range of an input voltage. An input voltage below this limited range may not provide a sufficient output power, whereas an input voltage above this limited range may result in an output power that causes a damage in circuits of a load.

Meanwhile, in Internet of Things (IoT), an energy harvesting (EH) technique for replacing a battery by a power supply of a device is known in the art. In the energy harvesting, devices receive a power by weak signals which are wirelessly transmitted. In an energy harvesting power supply, input signals are not only weak, but also have very large fluctuations. Accordingly, there is a technical challenge for adopting a buck-boost DC-DC converter in the energy harvesting power supply.

Further, for example, a power supply which supplies a power to an IoT device through energy harvesting is required to be low cost while having a small size. Therefore, it is important for a power management integrated circuit (PMIC) which supports the energy harvesting to achieve a fully integrated structure, so as to minimize peripheral individual devices such as an inductor.

Furthermore, for example, when the IoT device is portable, or is located far from a power supply system, or for the convenience of installation and construction, it is important for the power supply thereof to operate by its own power without receiving a separate power from an external power supply.

SUMMARY OF THE INVENTION

In consideration of the above-mentioned circumstances, it is an object of the present invention to provide a buck-boost DC-DC converter which is capable of operating even when an input voltage is extremely low.

In addition, another object of the present invention is to provide a buck-boost DC-DC converter which is capable of operating even when an input voltage has very large fluctuations.

Further, another object of the present invention is to provide a buck-boost DC-DC converter which is capable of minimizing peripheral devices by being fully integrated.

Furthermore, another object of the present invention is to provide a self-powered buck-boost DC-DC converter, which operates by its own power.

To achieve the above objects, according to an aspect of the present invention, there is provided a voltage booster including charge pumps connected in series with each other ('cascaded charge pumps') to adjust an input signal within a range of an input voltage of a buck-boost DC-DC converter. Clocks for driving the cascaded charge pumps are supplied from a LC resonant unit which receives and operates by its own power ('self-powered LC resonant unit').

According to another aspect, a power input terminal of a first stage of a plurality of charge pumps in the voltage booster is grounded. The cascaded charge pumps are driven only by the clock supplied from the LC resonant unit to output an amplified voltage. The LC resonant unit outputs, for example, a power signal in a form of a clock from a weak input signal in a form of an RF signal. The charge pumps of the voltage booster may be driven by this clock type power signal without supplying a separate external power.

In addition, according to another aspect, the voltage booster may further include a programmable wiring logic which is connected to an output of each of the charge pumps, and selectively connects the output of each of the charge pumps to one of an input terminal of a charge pump of a next-stage or the last output terminal, for each charge pump.

Further, according to another aspect, an output voltage of the voltage booster may be controlled within a rated range by adjusting the number of cascaded charge pumps of the voltage booster according to the input voltage of the buck-boost converter.

Further, according to another aspect, a controllable voltage division circuit may be added to the output terminal to finely adjust the output of the voltage booster.

Further, according to another aspect, Dickson charge pumps suitable for a low voltage may be adopted in the voltage booster. A pair of clocks having phases opposite to each other required to drive the Dickson charge pumps may be supplied by an LC resonant circuit including cross-connected switching devices adopted by the present invention.

Further, according to another aspect, the power input terminal of the first stage of the plurality of cascaded Dickson charge pumps in the voltage booster may be grounded. The cascaded charge pumps output an amplified voltage by being driven only by a clock type signal supplied from the LC resonant unit.

Furthermore, according to another aspect, the voltage booster may include a low voltage amplification unit in which each of the Dickson charge pumps is implemented as a low voltage transistor, and a high voltage amplification unit in which each of the Dickson charge pumps is implemented as a high voltage transistor. According to an auxiliary aspect, it is possible to cope with voltage fluctuations of an input signal by combining the Dickson charge pumps of the low voltage amplification unit and the Dickson charge pumps of the high voltage amplification unit.

According to the present invention, the buck-boost DC-DC converter may operate even when the input voltage is extremely low, such as an input signal wirelessly received. Further, the inventive buck-boost DC-DC converter may stably supply a power even when the input voltage has large fluctuations, such as an input signal wirelessly received. Furthermore, the inventive buck-boost DC-DC converter is fully integrated, thereby minimizing peripheral devices, and simplifying designs of the power supply as well as reducing costs. Furthermore, the inventive buck-boost DC-DC converter is a self-powered device which facilitates installation and construction and has high degrees of freedom in application fields.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The above-described and additional aspects are embodied through embodiments which will be described with reference to the accompanying drawings. It should be understood that components of the respective embodiments may be variously combined within the embodiments unless otherwise stated or contradictory to each other.

Figure 1:
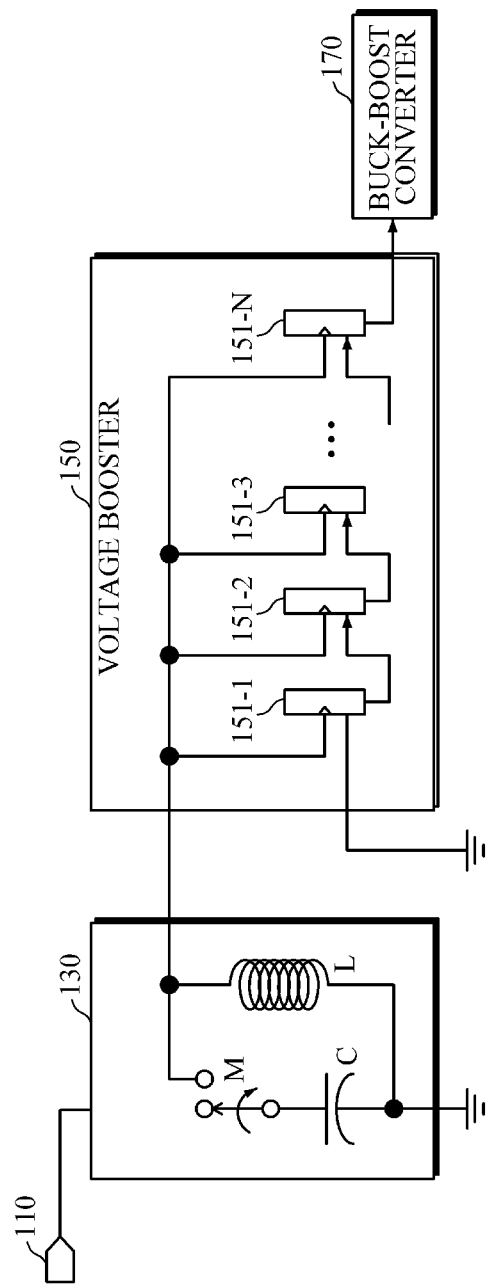
FIG. 1 is a block diagram illustrating a configuration of a buck-boost DC-DC converter according to an embodiment.

FIG. 1 is a block diagram illustrating a configuration of a buck-boost DC-DC converter according to an embodiment. As shown in FIG. 1, the buck-boost DC-DC converter according to an embodiment includes an LC resonant unit 130, a voltage booster 150, and a buck-boost converter 170.

The LC resonant unit 130 converts an input signal input through an input terminal 110 into a clock signal and outputs the converted signal. The input signal input to the input terminal 110 may be, for example, an RF signal received from an antenna. In one embodiment, the LC resonant unit 130 may be an LC resonant circuit having a switching unit M to compensate for attenuation in an LC tank circuit. As shown in FIG. 1, the LC resonant unit is composed of a circuit that does not require a separate power supply other than the input signal ('self-powered circuit').

Figure 2:
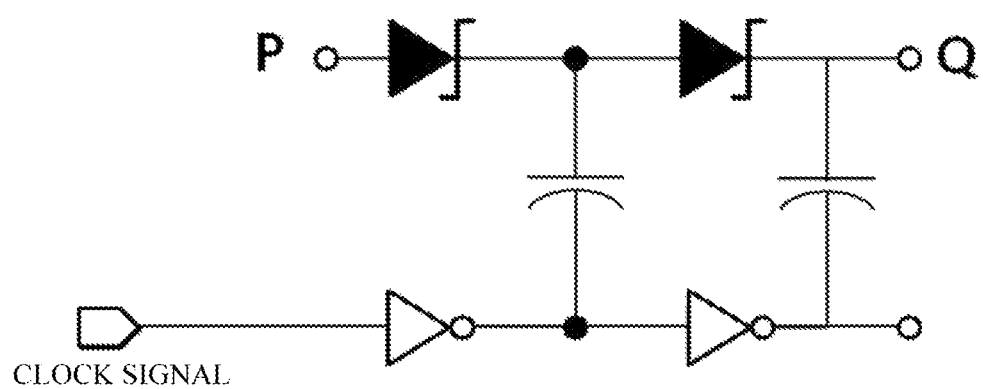
FIG. 2 is a diagram illustrating an embodiment of cascaded charge pumps that may be adopted in the embodiment shown in FIG. 1.

The voltage booster 150 includes a plurality of charge pumps 151-1, 151-2, . . . and 151-N, which are respectively driven by a clock output from the LC resonant unit 130 and are connected in series with each other, and is configured to amplify the input voltage. In one embodiment, the charge pump may be a charge pump which is driven by a single clock and has a known structure as shown in FIG. 2. As shown in FIG. 1, the clock output from the LC resonant unit 130 is commonly input to clock terminals of each charge pump. Among the plurality of cascaded charge pumps, an input terminal P of a first stage charge pump is grounded, and an output of a pre-stage is connected to an input of a post-stage. With such a structure, a plurality of cascaded charge pumps operate only by a clock signal output from the LC resonant unit 130 and do not require a separate power supply. The number of charge pumps connected in series with each other may be designed by taking into account a voltage range of the input signal and a rated input range of the buck-booster converter 170 of the post-stage. The buck-boost converter 170 boosts and outputs an output power of the voltage booster 150. The configuration of the buck-boost converter 170 is known in the art, and therefore will not be described in detail.

It should be noted that the embodiment shown in FIG. 1 may be implemented as a self-powered fully integrated circuit that does not require a separate external power supply other than the RF signal input, and has only a minimum of external devices connected thereto. In a case of the LC resonant unit 130, a technique that reduces a capacity of an inductor to integrate the same is known in the art. Further, in the illustrated embodiment, integration of the charge pumps and wirings constituting the voltage booster 150 or integration of the buck-booster converter 170 is also a known technique. According to the present invention, the LC resonant unit 130 may generate a resonance by the input RF signal and outputs a power signal in a form of a clock, and the charge pumps of the voltage booster 150 may be driven by the power signal of the clock form without supplying a separate external power.

Figure 3:
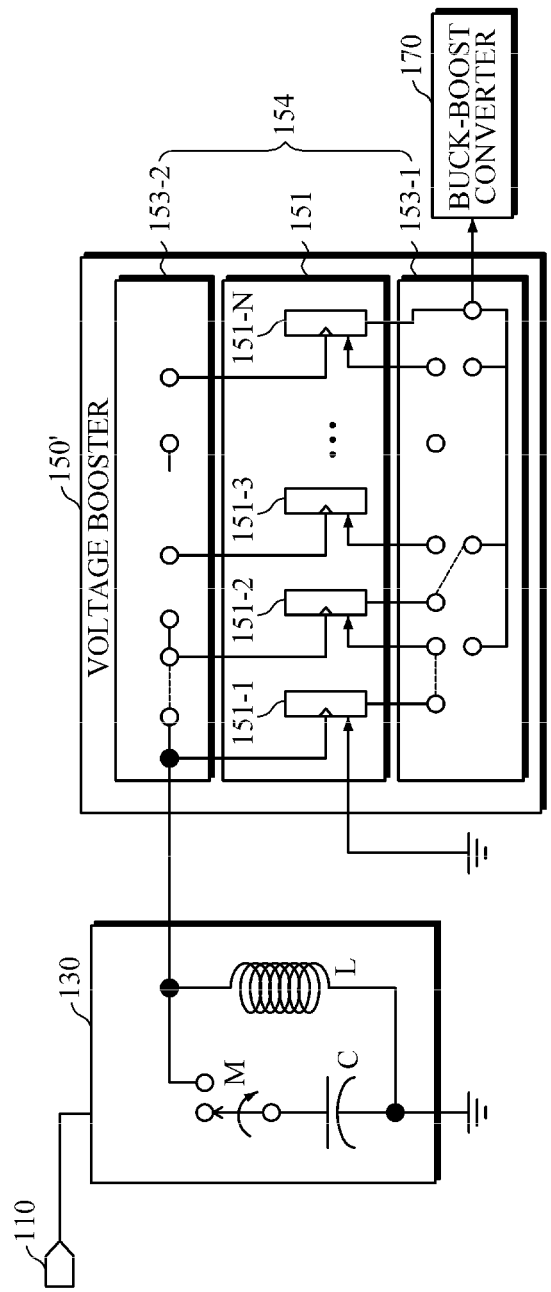
FIG. 3 is a block diagram illustrating a configuration of a buck-boost DC-DC converter according to another embodiment.

According to another aspect, the voltage booster may further include a programmable wiring logic 153. FIG. 3 is a block diagram illustrating a configuration of a buck-boost DC-DC converter according to another embodiment. Components similar to those of the embodiment in FIG. 1 are denoted by the same reference numerals. As shown in FIG. 3, a voltage booster 150' includes a plurality of cascaded charge pumps 151 and a programmable wiring logic 153. The programmable wiring logic 153 may be, for example, electrically programmable logic which is programmed according to a product model or specification in a factory. A programmable wiring logic 153-1 is connected to an output of each of the charge pumps, and selectively connects the output of each of the charge pumps to one of an input terminal of a charge pump of a next-stage or the last output terminal, for each charge pump. In addition, a programmable wiring logic 153-2 selectively connects a clock input to a clock input terminal of the respective charge pumps, for each charge pump. In the illustrated embodiment, only two charge pumps 151-1 and 151-2 of voltage booster 150' contribute to the output. Similar to the embodiment of FIG. 1, it should be noted that the embodiment shown in FIG. 3 may be implemented as a self-powered fully integrated circuit that does not require a separate external power supply other than the RF signal input and has only a minimum of external devices connected thereto.

Figure 4:
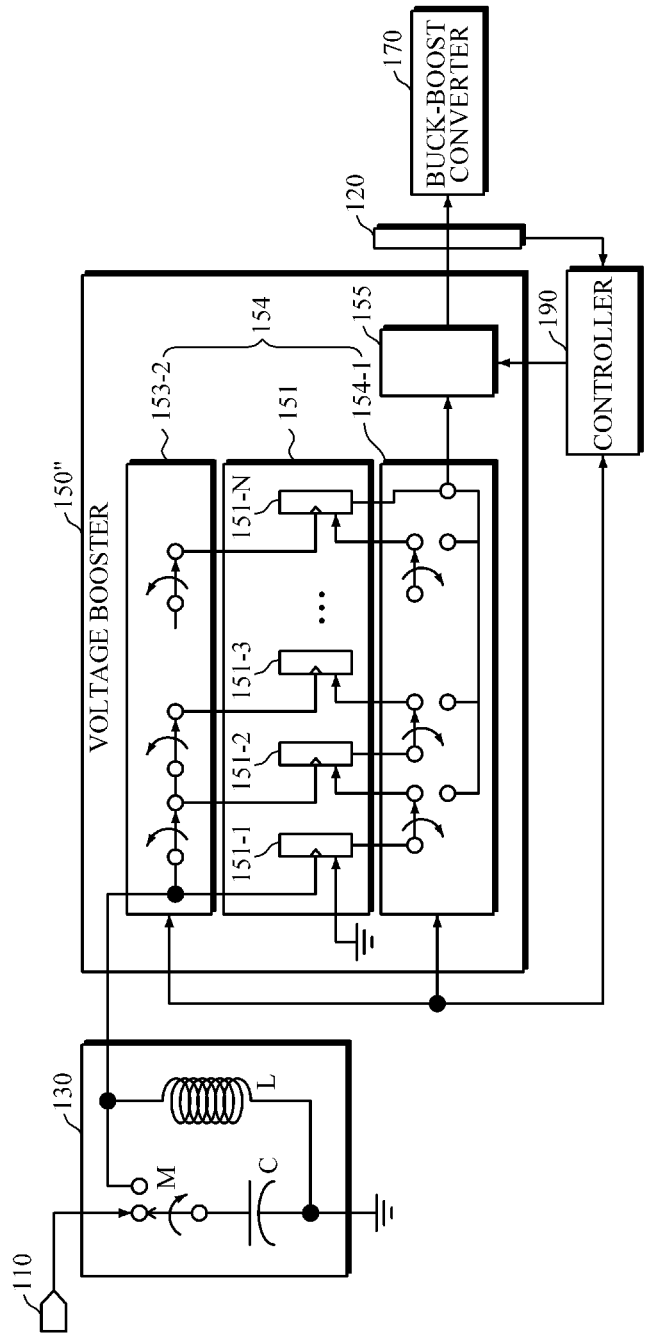
FIG. 4 is a block diagram illustrating a configuration of a buck-boost DC-DC converter according to another embodiment.

FIG. 4 is a block diagram illustrating a configuration of a buck-boost DC-DC converter according to another embodiment. Components similar to those of the embodiment shown in FIG. 3 are denoted by the same reference numerals. The similar components will not be described.

According to another aspect, in the illustrated embodiment, a voltage booster 150" may further include an output adjustment unit 154 and a controller 190. The output adjustment unit 154 is connected to an output of each of the charge pumps 151-1, 151-2, . . . and 151-N, and includes switches 154-1 and 154-2 selectively connect the output of each charge pump to one of an input terminal of the next-stage charge pump or the last output terminal, for each charge pump. The controller 190 controls connections of the switches of the output adjustment unit 154 according to an input voltage of the buck-boost converter 170. That is, the controller 190 increases the output by increasing the number of cascaded charge pumps if the output of the voltage booster 150 is lower than the rated voltage range of the input of the buck-boost converter 170, and decreases the output by reducing the number of cascaded charge pumps if the output of the voltage booster 150'' is higher than the rated voltage range of the input of the buck-boost converter 170.

According to another aspect, the voltage booster 150'' may further include a controllable voltage division unit 155. The controllable voltage division unit 155 divides the output of the output adjustment unit 154 into voltages at a rate set by the controller 190 and outputs the divided voltages. In one embodiment, the controllable voltage division unit 155 may include a fixed resistor and a controllable variable resistor. The controllable variable resistor may be implemented as, for example, resistor arrays and analog switches for switching connections between nodes and output terminals between the resistor arrays. Such a controllable variable resistor is known in electric circuit fields, and therefore will not be described in detail.

In the drawings, 120 denotes a sensor for detecting the input voltage of the buck-booster converter or a feedback connection.

Similar to the above-described embodiment, it should be noted that the embodiment shown in FIG. 4 may be implemented as a self-powered fully integrated circuit that does not require a separate external power supply other than the RF signal input and has only a minimum of external devices connected thereto.

Figure 5:
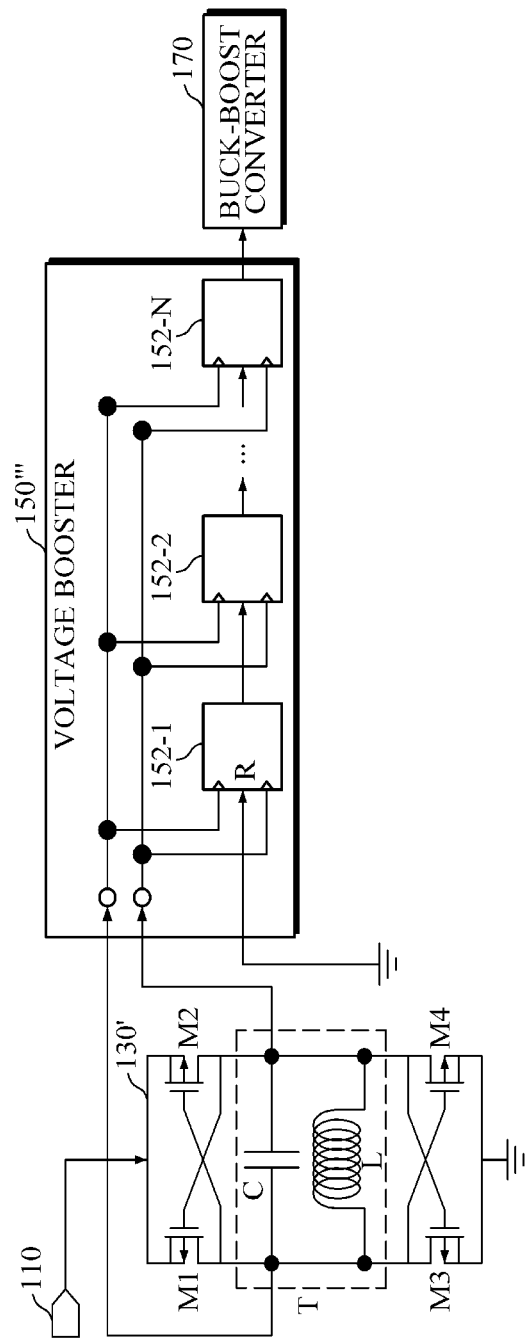
FIG. 5 is a block diagram illustrating a configuration of a buck-boost DC-DC converter according to another embodiment.

FIG. 5 is a block diagram illustrating a configuration of a buck-boost DC-DC converter according to another embodiment. Components similar to those of the embodiment shown in FIG. 1 are denoted by the same reference numerals. As shown in FIG. 5, the buck-boost DC-DC converter according to an embodiment includes an LC resonant unit 130', a voltage booster 150''', and a buck-boost converter 170.

The LC resonant unit 130' outputs a pair of clocks having phases opposite to each other from an input signal input to the input terminal 110. The input signal input to the input terminal 110 may be, for example, an RF signal received from an antenna.

In one embodiment, the LC resonant unit 130' may include an LC resonant loop T, a first pair of transistors M1 and M2, and a pair of second transistors M3 and M4. The LC resonant loop T outputs clocks having phases opposite to each other by resonance. In the illustrated embodiment, the transistors M1 to M4 are MOSFETs. As shown in FIG. 5, each of drains of the first pair of transistors M1 and M2 is connected to the LC resonant loop T, each of gates is connected to a drain of the other transistor, and each of sources is connected to the input voltage. As shown in FIG. 5, each of drains of the second pair of transistors M3 and M4 is connected to the LC resonant loop T, each of gates is connected to a drain of the other transistor, and each of sources is connected to a ground. Each pair of transistors are cross-connected to increase an oscillation amplitude and reduce a phase noise. The drains of each MOSFET are cross-connected with the LC resonant loop T to maintain resonance so that the output of the LC resonant loop T does not fall below the MOSFET's threshold voltage constraint, and a higher amplitude gain is achieved even in a very low voltage range of the input signal.

Figure 6:
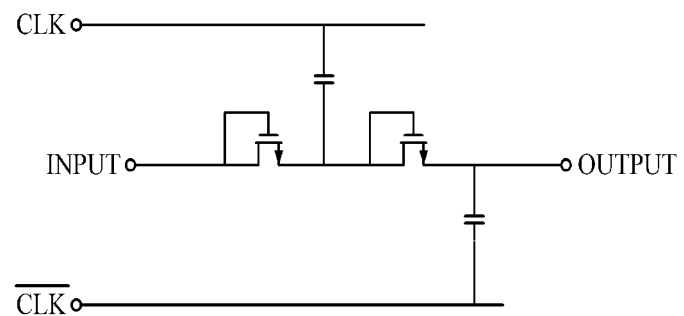
FIG. 6 is a circuit diagram illustrating a typical Dickson charge pump.

The voltage booster 150''' includes a plurality of Dickson charge pumps driven by a pair of clocks output from the LC resonant unit 130' and connected in series with each other ('cascaded Dickson charge pumps'), and is configured to amplify the input voltage. FIG. 6 is a circuit diagram illustrating a typical Dickson charge pump. The Dickson charge pump is one of the voltage multipliers used for low voltage and is driven by a pair of clocks having phases opposite to each other.

As shown in FIG. 5, a pair of clocks output from the LC resonant unit 130 are commonly input to positive and negative clock terminals of each of the charge pumps. Among a plurality of cascaded charge pumps, an input terminal R of the first stage of the charge pump is grounded, and an output of the pre-stage is connected to an input of the post-stage. Due to this structure, the plurality of cascaded charge pumps operate only by clock signals output from the LC resonant unit 130, and do not require a separate power supply. The number of charge pumps connected in series with each other may be designed by taking into account a voltage range of the input signal and a rated input range of the buck-booster converter 170 of the post-stage.

The buck-boost converter 170 boosts and outputs an output power of the voltage booster 150. The configuration of the buck-boost converter 170 is known in the art, and therefore will not be described in detail.

Similar to the above-described embodiment, it should be noted that the embodiment shown in FIG. 5 may be implemented as a self-powered fully integrated circuit that does not require a separate external power supply other than the RF signal input and has only a minimum of external devices connected thereto.

Figure 7:
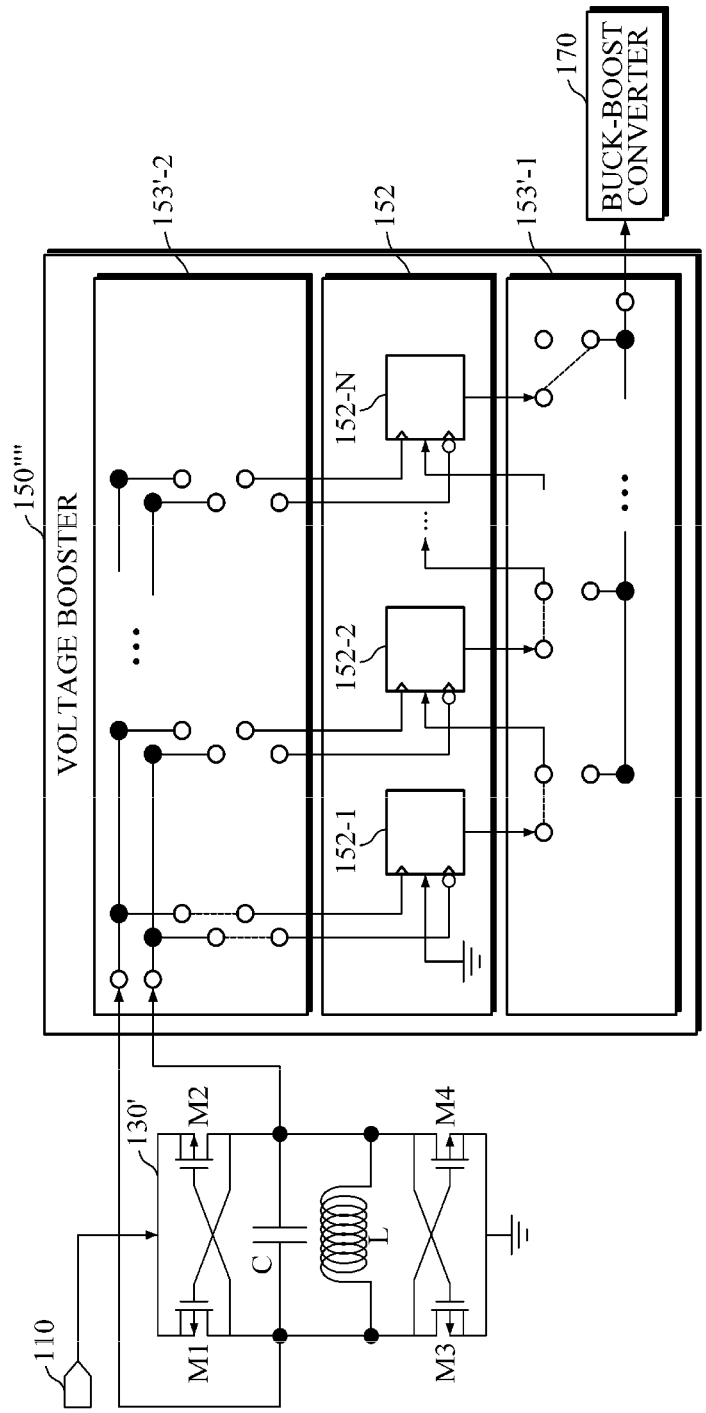
FIG. 7 is a block diagram illustrating a configuration of a buck-boost DC-DC converter according to another embodiment.

According to another aspect, a voltage booster 150'''' may further include a programmable wiring logic 153'. FIG. 7 is a block diagram illustrating a configuration of a buck-boost DC-DC converter according to another embodiment. In the illustrated embodiment, the voltage booster 150'''' includes a plurality of charge pumps 152 and programmable wiring logic 153' connected in series with each other. The programmable wiring logic 153' may be, for example, electrically programmable logic which is programmed according to a product model in a factory. A programmable wiring logic 153'-1 is connected to an output of each of the charge pumps, and selectively connects the output of each of the charge pumps to one of an input terminal of a charge pump of a next-stage or the last output terminal, for each charge pump. In addition, a programmable wiring logic 153'-2 selectively connects clock inputs to clock input terminals of the respective charge pumps, for each charge pump. In the illustrated embodiment, all charge pumps 151-1 and 151-2 of voltage booster 150'''' are each other to contribute to the output.

Similar to the above-described embodiment, it should be noted that the embodiment shown in FIG. 7 may be implemented as a self-powered fully integrated circuit that does not require a separate external power supply other than the RF signal input and has only a minimum of external devices connected thereto.

Figure 8:
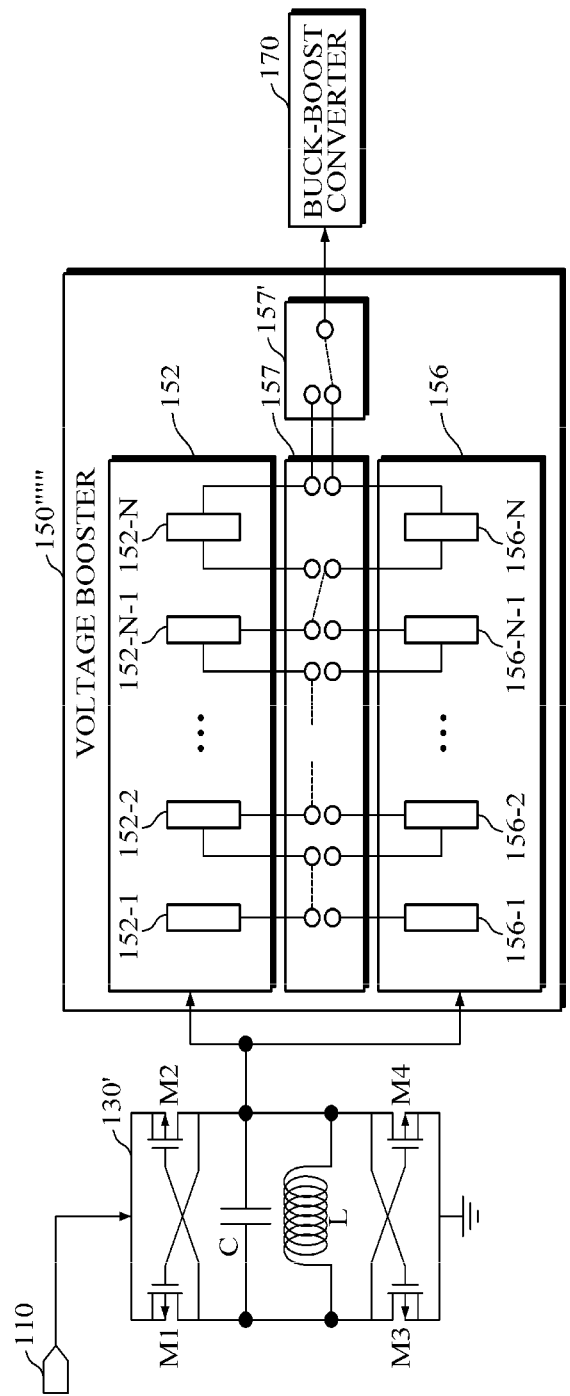
FIG. 8 is a block diagram illustrating a configuration of a buck-boost DC-DC converter according to another embodiment.

FIG. 8 is a block diagram illustrating a configuration of a buck-boost DC-DC converter according to another embodiment. Components similar to those of the above-described embodiments in FIGS. 1 to 7 are denoted by the same reference numerals. In the illustrated embodiment, a voltage booster 150''''' includes a low voltage amplification unit 152, a high voltage amplification unit 156, and a connecting conductor 157.

Each of the low voltage amplification units 152 is implemented as a low voltage transistor, and includes a plurality of cascaded Dickson charge pumps. For example, the low voltage amplification unit 152 is a configuration similar to the plurality of cascaded charge pumps 152 of the voltage booster 150''' shown in FIG. 5 or the voltage booster 150'''' shown in FIG. 7, and may have a configuration in which each of the Dickson charge pumps is implemented as a low voltage transistor.

Each of the high voltage amplification units 156 is implemented as a high voltage transistor, and includes a plurality of cascaded Dickson charge pumps. For example, the high voltage amplification unit 156 is a configuration similar to the plurality of cascaded charge pumps 152 of the voltage booster 150''' shown in FIG. 5 or the voltage booster 150'''' shown in FIG. 7, and may have a configuration in which each of the Dickson charge pumps is implemented as a high voltage transistor. In the illustrated embodiment, the low voltage amplification unit 152 and the high voltage amplification unit 156 are shown to include the same number of Dickson charge pumps, but it is intended to maximize flexibility in designs, and limitation thereof is not essentially required.

The connecting conductor 157 is configured to connect a part of Dickson charge pumps 152-1, 152-2, . . . and 152-N of the low voltage amplification unit 152 with a part of Dickson charge pumps 156-1, 156-6, . . . and 156-N of the high voltage amplification unit 156. In one embodiment, the connecting conductor 157 may be a metal line of an integrated circuit. However, in the present invention, the connecting conductor is defined to encompass various types of continuous and intermittent electrical conduction means such as metal wirings, switches, transistors, doped regions and the like. When designing as a configuration in which a predetermined number, for example, in the illustrated embodiment, N Dickson charge pumps are connected with each other, among N charge pumps, if the number of Dickson charge pumps belonging to the high voltage amplification unit 156 is increased, a voltage amplification factor is increased, and if the number of Dickson charge pumps belonging to the low voltage amplification unit 152 is decreased, the voltage amplification factor is decreased. Herein, according to the range of the input signal and the rated input range of the buck-booster converter 170 of the post-stage, it may be designed by adjusting the ratio thereof. Although not illustrated in the drawings for the sake of simplicity, the wiring should be designed so that the clock type power signal supplied from the LC resonant unit 130' is also supplied only to the Dickson charge pumps which are effectively connected with each other.

In the embodiment of FIG. 8, the connecting conductor 157 is implemented by including programmable wiring logic. In this embodiment, the connecting conductor 157 is connected to an output of each of Dickson charge pumps of a low voltage amplification unit 152, and selectively connects the output of each of the Dickson charge pumps to an input of the Dickson charge pump in the next stage of the low voltage amplification unit 152 or an input line of the Dickson charge pump in the next stage of the high voltage amplification unit 156. The programmable wiring 157' is a part of the connecting conductor, and when the voltage booster 150'''' includes only the Dickson charge pumps 152-1, 152-2, . . . and 152-N belonging to the low voltage amplification unit 152, or only the Dickson charge pumps 156-1, 156-6, . . . and 156-N belonging to the high voltage amplification unit 156, one of the outputs thereof may be selected. In the illustrated embodiment, since the output of the last Dickson charge pump 156-N of the high voltage amplification unit 156 is the last output, the programmable wiring 157' is connected downward.

The programmable wiring logic 153 may be, for example, electrically programmable logic which is programmed according to a product model or specification in a factory. In the illustrated embodiment, by connecting N-1 Dickson charge pumps 152-1, 152-2, . . . and 152-N-1 of the low voltage amplification unit 152 with the last Dickson charge pump 156-N of the high voltage amplification unit 156, the voltage booster 150''''' outputs the power signal amplified from the input clock signals through all of N charge pumps.

Although not illustrated in the drawings for the sake of simplicity, each of the Dickson charge pumps 152-1, 152-2, . . . and 152-N of the low voltage amplification unit 152, and each of the Dickson charge pumps 156-1, 156-6, . . . and 156-N of the high voltage amplification unit 156 should be provided with a programmable wiring logic for supplying the clock signal similar to the programmable wiring logic 153'-2 shown in FIG. 7, so that the clock type power signal supplied from the LC resonant unit 130' is supplied only to the Dickson charge pumps which are effectively connected with each other. This configuration may be derived by applying the configuration of the embodiment shown in FIG. 7 to the embodiment shown in FIG. 8.

Similar to the above-described embodiment, it should be noted that the embodiment shown in FIG. 8 may be implemented as a self-powered fully integrated circuit that does not require a separate external power supply other than the RF signal input and has only a minimum of external devices connected thereto.

Figure 9:
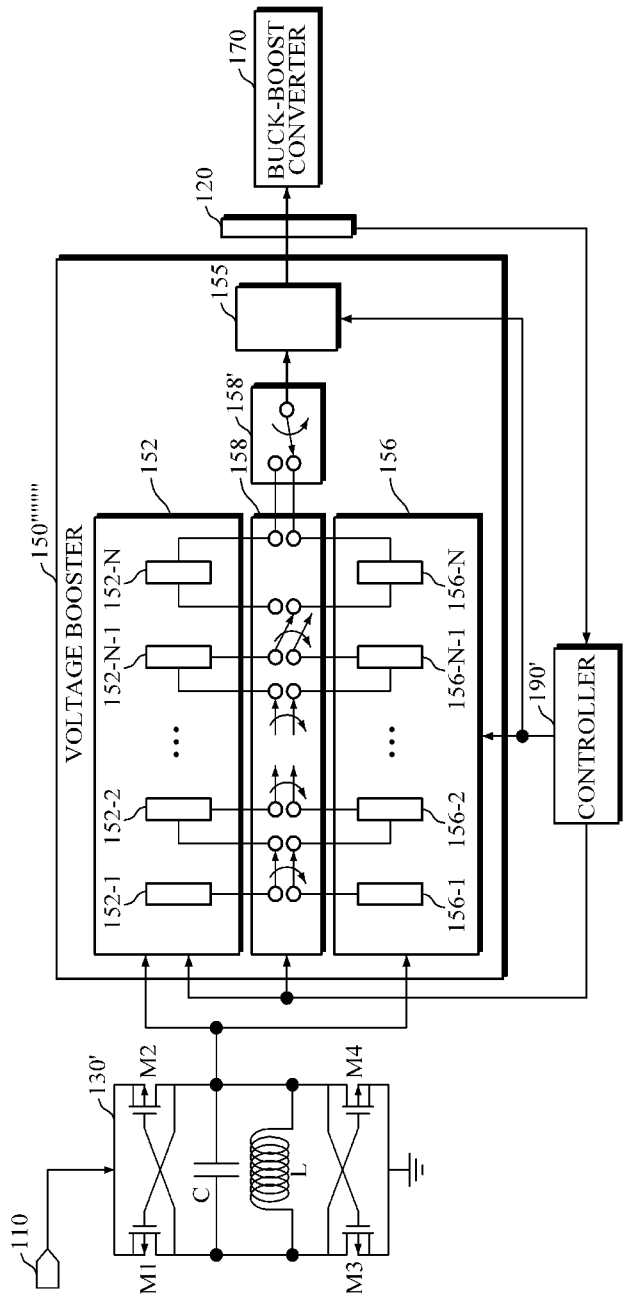
FIG. 9 is a block diagram illustrating a configuration of a buck-boost DC-DC converter according to another embodiment.

FIG. 9 is a block diagram illustrating a configuration of a buck-boost DC-DC converter according to another embodiment. In the illustrated embodiment, the connecting conductor is implemented by including additional output adjustment units 158 and 158' that include switch arrays. Further, the DC-DC converter according to the illustrated embodiment further includes a controller 190'. In this embodiment, the output adjustment unit 158 is connected to an output of each of the Dickson charge pumps of a low voltage amplification unit 152, and selectively connects the output of each of the Dickson charge pumps to an input of the Dickson charge pump in the next stage of the low voltage amplification unit 152 or an input line of the Dickson charge pump in the next stage of the high voltage amplification unit 156. In the illustrated embodiment, by connecting N-1 Dickson charge pumps 152-1, 152-2, . . . and 152-N-1 of the low voltage amplification unit 152 with the last Dickson charge pump 156-N of the high voltage amplification unit 156, the voltage booster 150'''''' outputs the power signal amplified from the input clock signals through all of N charge pumps.

The switch 158' is a part of the output adjustment unit, and the voltage booster 150''''''' includes only the Dickson charge pumps 152-1, 152-2, . . . and 152-N belonging to the low voltage amplification unit 152, or only the Dickson charge pumps 156-1, 156-6, . . . and 156-N belonging to the high voltage amplification unit 156, one of the outputs thereof may be selected. In the illustrated embodiment, since the output of the last Dickson charge pump 156-N of the high voltage amplification unit 156 is the last output, the switch 158' is connected downward. The switches constituting the output adjustment units 158 and 158' may include semiconductor switches such as MOSFETs, for example. The configuration of these switches will be described below.

Although not illustrated in the drawings for the sake of simplicity, each of the Dickson charge pumps 152-1, 152-2, . . . and 152-N of the low voltage amplification unit 152, and each of the Dickson charge pumps 156-1, 156-6, ... and 156-N of the high voltage amplification unit 156 should be provided with a programmable wiring logic for supplying the clock signal, so that the clock type power signal supplied from the LC resonant unit 130' is supplied only to the Dickson charge pumps which are effectively connected with each other. The configuration of these switches will be described below.

The controller 190' controls connections of the switches of the output adjustment units 158 and 158' according to the input voltage of the buck-boost converter 170. That is, the controller 190' increases the output by increasing the number of cascaded charge pumps if the output of the voltage booster 150''''''' is lower than the rated voltage range of the input of the buck-boost converter 170, and decreases the output by reducing the number of cascaded charge pumps if the output of the voltage booster 150''''''' is higher than the rated voltage range of the input of the buck-boost converter 170.

According to another aspect, the controller 190' may control the output adjustment unit so as to connect the Dickson charge pumps 152-1, 152-2, ... and 152-N of the low voltage amplification unit 152 with the Dickson charge pumps 156-1, 156-6, ... and 156-N of high voltage amplification unit 156 in different combinations according to the input voltage of the buck-boost converter 170. For example, while constantly maintaining the number of the cascaded Dickson charge pumps, it is possible to control so as to vary ratios of the number of Dickson charge pumps of the low voltage amplification unit and the number of Dickson charge pumps of the high voltage amplification unit.

According to another aspect, the voltage booster 150''''''' may further include a controllable voltage division unit 155. The controllable voltage division unit 155 divides the output of the output adjustment unit 154 into voltages at a rate set by the controller 190' and outputs the divided voltages. In one embodiment, the controllable voltage division unit 155 may include a fixed resistor and a controllable variable resistor. The controllable variable resistor may be implemented as, for example, resistor arrays and analog switches for switching connections between nodes and output terminals between the resistor arrays. Such a controllable variable resistor is known in electric circuit fields, and therefore will not be described in detail.

In the drawings, 120 denotes a sensor for detecting the input voltage of the buck-booster converter or a feedback connection.

Similar to the above-described embodiment, it should be noted that the embodiment shown in FIG. 9 may be implemented as a self-powered fully integrated circuit that does not require a separate external power supply other than the RF signal input and has only a minimum of external devices connected thereto.

Figure 10:
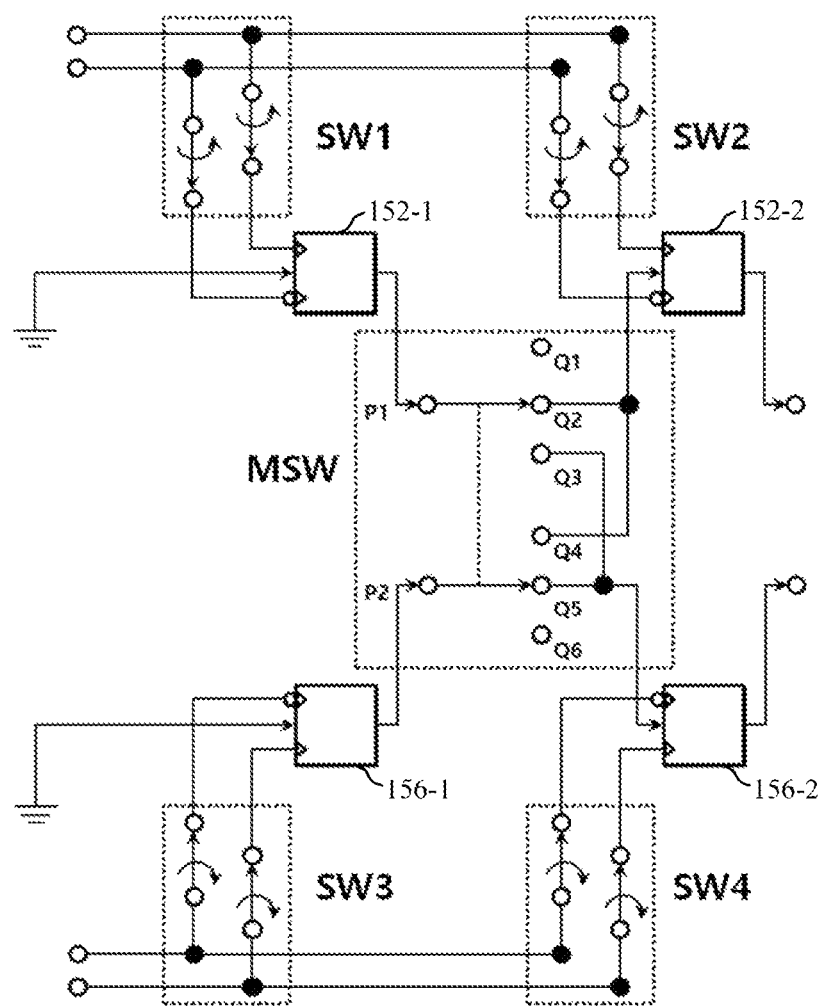
FIG. 10 is a diagram schematically illustrating an embodiment of a configuration of semiconductor switches constituting an output adjustment unit 158 in FIG. 9.

FIG. 10 schematically illustrates an embodiment of the configuration of semiconductor switches constituting the output adjustment unit 158 shown in FIG. 9. For convenience of description, only a part of the Dickson charge pumps constituting the low voltage amplification unit 152 and the high voltage amplification unit 156 are shown in FIG. 10. Switches SW1, SW2, SW3 and SW4 are configured to switch the power supplied to each of the Dickson's charge pumps 152-1, 152-2, 156-1 and 156-2 of a pair of clock type power signals having phases opposite to each other output from the LC resonant unit 130'. Herein, it should be noted that the switch SW1 and SW3, SW2 and SW4 are controlled opposite to each other so that, when clock signals are supplied to the Dickson charge pumps 152-1 and 152-2 of the low voltage amplification unit 152, the clock signals are not supplied to the Dickson charge pumps 156-1 and 156-2 of the high voltage amplification unit 156.

It may seem that a switch MSW is two switches in which switching operations are logically performed in conjunction with each other. An upper switch connects an input terminal P1 to one of three output terminals Q1, Q2 and Q3. A lower switch connects an input terminal P2 to one of three output terminals Q4, Q4 and Q6. The output terminal Q2 of the upper switch and the output terminal Q4 of the lower switch are commonly connected to an input terminal of the Dickson charge pump 152-2 of the next stage belonging to the low voltage amplification unit 152. The output terminal Q3 of the upper switch and the output terminal Q5 of the lower switch are commonly connected to an input terminal of the Dickson charge pump 156-2 of the next stage belonging to the high voltage amplification unit 156. The output terminal Q1 of the upper switch and the output terminal Q6 of the lower switch are not connected anywhere.

When the input terminal P1 of the upper switch is connected to the output terminal Q1, the input terminal P2 of the lower switch is connected to the output terminal Q4. At this time, the output of the Dickson charge pump 152-1 belonging to the low voltage amplification unit 156 is not connected anywhere, and the output of the Dickson charge pump 156-1 belonging to the high voltage amplification unit 156 is connected to the input terminal of the Dickson charge pump 152-2 of the next stage belonging to the low voltage amplification unit 152.

When the input terminal P1 of the upper switch is connected to the output terminal Q2, the input terminal P2 of the lower switch is connected to the output terminal Q5. At this time, the output of the Dickson charge pump 152-1 belonging to the low voltage amplification unit 152 is connected to the input terminal of the Dickson charge pump 152-2 of the next stage belonging to the low voltage amplification unit 152, and the output of the Dickson charge pump 156-1 belonging to the high voltage amplification unit 156 is connected to the input terminal of the Dickson charge pump 156-2 of the next stage belonging to the high voltage amplification unit 156. However, since only one of the two charge pumps outputs a valid power signal, no problem occurs.

When the input terminal P1 of the upper switch is connected to the output terminal Q3, the input terminal P2 of the lower switch is connected to the output terminal Q6. At this time, the output of the Dickson charge pump 152-1 belonging to the low voltage amplification unit 152 is connected to the input terminal of the Dickson charge pump 156-2 of the next stage belonging to the high voltage amplification unit 156, and the output of the Dickson charge pump 156-1 belonging to the high voltage amplification unit 156 is not connected anywhere.

Figure 11:
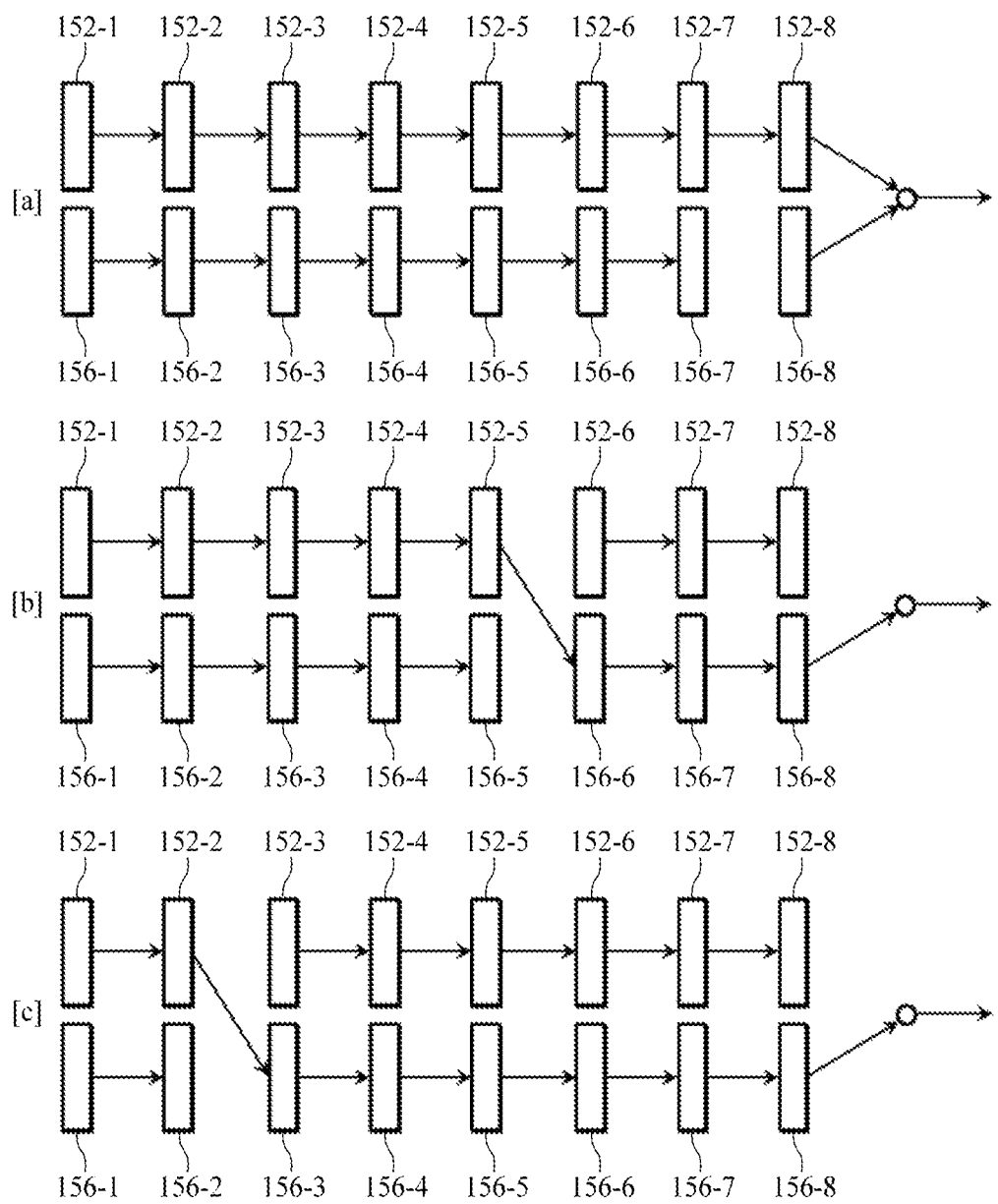
FIG. 11 is a diagram for describing connection control of Dickson charge pumps according to a power signal input to an input terminal in the embodiment shown in FIG. 9.

FIG. 11 is a diagram illustrating connection control of the Dickson charge pumps based on the power signal input to the input terminal in the embodiment shown in FIG. 9. In the illustrated embodiment, the low voltage amplification unit 152 and the high voltage amplification unit 156 include eight Dickson charge pumps, respectively. In the case of FIG. 11(a), among eight available Dickson charge pumps that contribute to the output of the voltage booster 150''''''', seven Dickson charge pumps 152-1, ... and 152-7 belong to the low voltage amplification unit 152, and one Dickson charge pump 156-8 belongs to the high voltage amplification unit 156. In the case of FIG. 11(b), among eight available Dickson charge pumps that contribute to the output of the voltage booster 150''''''', five Dickson charge pumps 152-1, . . . and 152-5 belong to the low voltage amplification unit 152, and three Dickson charge pumps 156-6, . . . and 156-8 belong to the high voltage amplification unit 156. In the case of FIG. 11(c), among eight Dickson charge pumps that contribute to the output of the voltage booster 150'''''', two Dickson charge pumps 152-1 and 152-2 belong to the low voltage amplification unit 152, and six Dickson charge pumps 156-3, . . . and 156-8 belong to the high voltage amplification unit 156. Obviously, the output voltages of the voltage booster 150'''''' have a relationship of (a)<(b)<(c).

While the present invention has been described through embodiments with reference to the accompanying drawings, the present invention is not limited to the above-described embodiments, and it will be understood by those skilled in the art that various modifications may be made therein without departing from the scope of the present invention as defined by the appended claims. The claims are intended to cover these modifications.

Description of Reference Numerals
110: Input terminal
120: Sensor
130: LC resonant unit
150: Voltage booster
151: Charge pumps
152: Low voltage amplification unit
153, 157: Programmable wiring logic
154, 158: Output adjustment unit
155: Controllable voltage division unit
156: High voltage amplification unit
170: Buck-booster converter
190: Controller

What is claimed is:

1. A buck-boost DC-DC converter comprising:
    an LC resonant unit configured to convert an input signal into a clock signal and output the converted clock signal;
    a voltage booster which includes a plurality of charge pumps driven by the clock signal output from the LC resonant unit and connected in series with each other ('cascaded charge pumps'), and is configured to amplify an input voltage thereof; and
    a buck-boost converter configured to boost and output an output power of the voltage booster,
    wherein a power input terminal of a first stage of the plurality of charge pumps in the voltage booster is grounded.

2. The buck-boost DC-DC converter according to claim 1, wherein the voltage booster further comprises a programmable wiring logic which is connected to an output of each of the charge pumps, and selectively connects the output of each of the charge pumps to one of an input terminal of a charge pump of a next-stage or the last output terminal, for each charge pump.

3. The buck-boost DC-DC converter according to claim 1, wherein the voltage booster comprises:
    an output adjustment unit which is connected to an output of each of the charge pumps, and selectively connects the output of each of the charge pumps to one of an input terminal of a charge pump of a next-stage or the last output terminal, for each charge pump; and
    a controller configured to control connections of switches of the output adjustment unit according to the input voltage of the buck-boost converter.

4. The buck-boost DC-DC converter according to claim 3, wherein the voltage booster further comprises:
    a controllable voltage division unit configured to divide an output of the output adjustment unit into voltages at a rate set by the controller and output the divided voltages.

5. The buck-boost DC-DC converter according to claim 1, wherein the clock signal outputted from the LC resonant unit includes a pair of clocks having phases opposite to each other and wherein each of the plurality of charge pumps are Dickson charge pumps driven by the pair of clocks.

6. The buck-boost DC-DC converter according to claim 5, wherein the LC resonant unit comprises:
    an LC resonant loop configured to output clocks having phases opposite to each other by resonance;
    a first pair of transistors, each of drains is connected to the LC resonant loop, each of gates is connected to a drain of the other transistor, and each of sources is connected to the input voltage; and
    a second transistor pair, each of drains is connected to the LC resonant loop, each of gates is connected to a drain of the other transistor, and each of sources is connected to a ground.

7. The buck-boost DC-DC converter according to claim 5, wherein a power input terminal of a first stage of the plurality of cascaded Dickson charge pumps in the voltage booster is grounded.

8. The buck-boost DC-DC converter according to claim 7, wherein the voltage booster further comprises a programmable wiring logic which is connected to an output of each of the Dickson charge pumps, and selectively connects the output of each of the Dickson charge pumps to one of an input terminal of a Dickson charge pump of a next-stage or the last output terminal, for each Dickson charge pump.

9. The buck-boost DC-DC converter according to claim 5, wherein the voltage booster comprises:
    a low voltage amplification unit including a plurality of Dickson charge pumps which are implemented as a low voltage transistor respectively, and are connected in series with each other;
    a high voltage amplification unit including a plurality of Dickson charge pumps which are implemented as a high voltage transistor respectively, and are connected in series with each other; and
    a connecting conductor configured to connect a part of the Dickson charge pumps of the low voltage amplification unit and a part of the Dickson charge pumps of the high voltage amplification unit.

10. The buck-boost DC-DC converter according to claim 9, wherein the connecting conductor comprises:
    a programmable wiring logic which is connected to an output of each of the Dickson charge pumps of the low voltage amplification unit, and selectively connects the output of each of the Dickson charge pumps to one of an input of the Dickson charge pump in the next stage of the low voltage amplification unit or an input line of the Dickson charge pump in the next stage of the high voltage amplification unit.

11. The buck-boost DC-DC converter according to claim 9, wherein the connecting conductor comprises:
    an output adjustment unit which is connected to an output of each of the Dickson charge pumps of the low voltage amplification unit, and selectively connects the output of each of the Dickson charge pumps to an input of the Dickson charge pump in the next stage of the low voltage amplification unit or an input line of the Dickson charge pump in the next stage of the high voltage amplification unit, and the DC-DC converter comprises:
a controller configured to control connections of switches of the output adjustment unit according to the input voltage of the buck-boost converter.

12. The buck-boost DC-DC converter according to claim 11,
wherein the controller controls the output adjustment unit so as to connect the Dickson charge pumps of the low voltage amplification unit with the Dickson charge pumps of high voltage amplification unit in different combinations according to the input voltage of the buck-boost converter, and controls the output adjustment unit so as to vary ratios of the number of Dickson charge pumps of the low voltage amplification unit and the number of Dickson charge pumps of the high voltage amplification unit.

13. The buck-boost DC-DC converter according to claim 11, wherein the voltage booster further comprises a controllable voltage division unit configured to divide an output of the output adjustment unit into voltages at a set ratio and output the voltages.

14. The buck-boost DC-DC converter according to claim 1, wherein no external power is supplied to the LC resonant unit and the voltage booster.

15. The buck-boost DC-DC converter according to claim 1, wherein the power input terminal of the first stage of the plurality of charge pumps in the voltage booster is not connected to any other portion than the ground.

16. A buck-boost DC-DC converter comprising:
an LC resonant unit configured to convert an input signal into a clock signal and output the converted clock signal;
a voltage booster which includes a plurality of charge pumps driven by the clock signal output from the LC resonant unit and connected in series with each other ('cascaded charge pumps'), and is configured to amplify an input voltage thereof; and
a buck-boost converter configured to boost and output an output power of the voltage booster,
wherein the clock signal outputted from the LC resonant unit includes a pair of clocks having phases opposite to each other and wherein each of the plurality of charge pumps are Dickson charge pumps driven by the pair of clocks,
wherein the voltage booster comprises:
a low voltage amplification unit including a plurality of Dickson charge pumps which are implemented as a low voltage transistor respectively, and are connected in series with each other.

17. The buck-boost DC-DC converter of claim 16, wherein the voltage booster further comprises:
a high voltage amplification unit including a plurality of Dickson charge pumps which are implemented as a high voltage transistor respectively, and are connected in series with each other.

18. The buck-boost DC-DC converter of claim 17, wherein the voltage booster further comprises:
a connecting conductor configured to connect a part of the Dickson charge pumps of the low voltage amplification unit and a part of the Dickson charge pumps of the high voltage amplification unit.

* * * * *